United States Patent [19]
Lehrer et al.

[11] Patent Number: 6,165,519
[45] Date of Patent: *Dec. 26, 2000

[54] FILTER FOR ADSORPTION FROM AND/OR DISPERSION OF INGREDIENTS INTO A FLUID

[75] Inventors: Robert Lehrer, Wilmington; Diane Frederick, Newark, both of Del.; Claus Mettenheimer, Kennett Square, Pa.; Robert G. Sandberg, Hockessin, Del.

[73] Assignee: Robert Lehrer Associates, Inc., Wilmington, Del.

[*] Notice: This patent is subject to a terminal disclaimer.

[21] Appl. No.: 09/273,110

[22] Filed: Mar. 19, 1999

[51] Int. Cl.$^7$ .................................................. B65B 29/02
[52] U.S. Cl. ................... 426/77; 426/84; 426/88; 426/89; 426/132; 210/501; 210/502.1; 210/777
[58] Field of Search .................................. 426/77, 88, 89, 426/84, 132, 422, 423, 495; 210/501, 502.1, 777

[56] References Cited

U.S. PATENT DOCUMENTS 5,885,633   3/1999   Lehrer ........................................ 426/77

FOREIGN PATENT DOCUMENTS 4038966   6/1992   Germany .

Primary Examiner—Anthony J. Weier
Attorney, Agent, or Firm—Connolly Bove Lodge & Hutz LLP

[57] ABSTRACT

A filter for the adsorption of ingredients from and/or the dispersion of ingredients into a fluid includes a matrix which has a plurality of particles having an inherently active surface or an active surface made of a fluid treating material. The particles are held in place by a moderately viscous binder which is impervious to the flow of the fluid. The particles, however, are made of a fluid pervious material. An insufficient amount of binder is incorporated in the matrix to otherwise completely cover the particles. Thus portions of the active surface of the particles remains exposed to the flow of fluid thereby resulting in tortuous paths of flow through the matrix, thereby assuring contact with the treating particles.

22 Claims, 1 Drawing Sheet

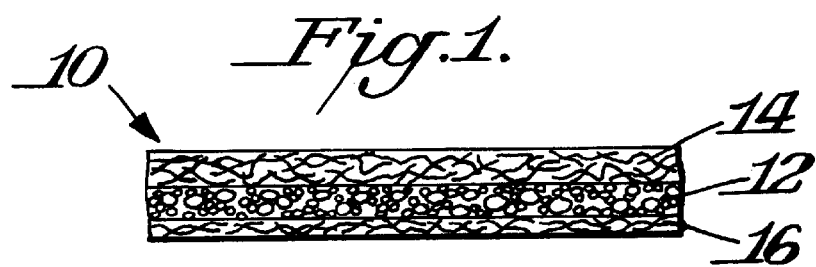
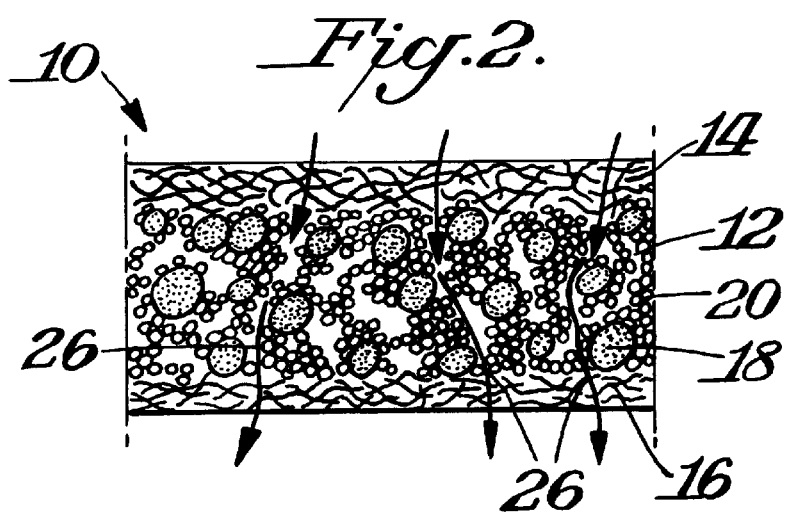
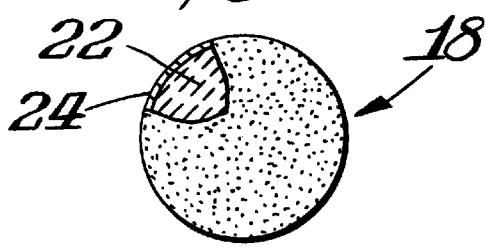
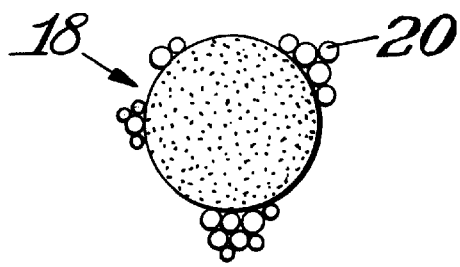

FILTER FOR ADSORPTION FROM AND/OR DISPERSION OF INGREDIENTS INTO A FLUID

BACKGROUND OF THE INVENTION

In various practices it is desirable to remove ingredients such as organic contaminants or inorganic ions which may be present as contaminants from a fluid (gas or liquid). For example, filters are used in laboratories and elsewhere for collecting contaminants from fluids such as water in order to purify the fluid and/or to analyze the contaminants. It is known to provide adsorbent material such as coated silica in order to remove the ingredients from the fluid. One practice involves the use of an extraction disk marketed by 3M under the trademark Empore® . Such disks are available in various membrane formats. One of these formats is the standard density format which is advertised as being able to process a wide range of sample types and volumes. The disk contains standard (55 micron) particle size sorbents. Another membrane format is high density which contains small (12 micron) particle size sorbents and is advertised as processing cleaner sample matrices in limited volume. Both forms of membrane formulations are intended to entrap sorbent particles within an inert matrix of polytetrafluoroethylene. The resulting particle-membrane (90% particles:10% PTFE, by weight) is said to result in a denser more uniform extraction bed than is achieved from SPE (Solid Phase Extraction) cartridges made from loosely packed particles. These disks use various particle types, such as silica, resins and ceramics. One form of Empore® incorporates a Teflon® web to entrap irregular shaped particles. The Telfon® web density and fibril diameter varies throughout the structure. The particles are generally of a size of 10–20 micron and Teflon fibrils comprise about ½ of the volume. Some specific uses of the disks are for oil and grease extraction. For example, an Oil & Grease Disk was intended for a Proposed EPA Method 1664 (N-Hexane Extractable Materials and Silica Gel Treated N-Hexane Extractable Material by Extraction and Gravimetry). The Empore® Oil & Grease disk is a multilayer structure which incorporates a center sorbent layer. Teflon fibrils create loose webbing throughout so as to trap spherical-shaped particles. The open web structure leaves space between the particles and also leaves gaps in the overall structure. Some irregular particles fill in between large spheres. The particle size is 60 micron spheres and 10–12 micron for the irregular particles. The Teflon fibrils comprise about ½ of the volume.

Another known form is the Restek Resprep™ C18AR 47MM Disk which is a single layer having a dense center with loose particles on the top and bottom to result in a very porous structure. Small spheres (5–12 micron) are located throughout with large open areas throughout. Glass material fills 50% or more of the surface area. The center has larger clumps of material with spherical media filling in portions of the surrounding area. The sorbents do not form a dense bed or continuous layer. There is a very open but continuous version of sorbent spheres in the glass.

In other titration practices, it is desirable to disperse ingredients into a fluid. Known uses for adding ingredients include the use of filter type structures which contain additive materials for beverages such as powdered cream or sugar in pockets. The liquid dissolves the material while passing through the pockets. Such uses are described, for example, in U.S. Pat. Nos. 5,567,461 and 5,885,633.

SUMMARY OF THE INVENTION

An object of this invention is to provide a filter for adsorbing ingredients or components from and/or dispersing ingredients or components into a fluid.

A further object of this invention is to provide such a filter which is particularly effective in operation.

A further object of this invention is to provide techniques for forming such a filter.

The filter of this invention incorporates a matrix for treating the fluids. The matrix comprises a plurality of particles having an active surface of a fluid treating material and which is pervious to the flow of the fluids. The particles are held in place by a moderately viscous binder which is impervious to the flow of fluid. The binder and particles in combination form a densely packed bed. An insufficient amount of binder is used which will prevent completely covering all of the particles. Accordingly, portions of the active surfaces of the particles are free of contact with the binder. The result is a formation of a tortuous path of flow being created through the bed at the portions of the active surface. Accordingly, the fluid is caused to intimately contact the fluid treating material on the active surfaces as the fluid flows through the bed.

In a preferred practice of this invention the particles and their active surfaces are fluid pervious. The particles, for example, are made in porous microparticulate form. The bed is preferably mounted on a fluid pervious support sheet and preferably a cover sheet is mounted over the bed. The cover sheet preferably functions as an initial filter to remove gross particulate contaminants while also protecting the bed.

The filter matrix may be used for various purposes such as for the removal of ingredients or contaminants from the fluid. Alternatively, or in addition, the matrix may be used to disperse ingredients into the fluid. For example, the matrix may be used in laboratories for collecting contaminants or may be used in restaurants to replenish the anti-oxidants in used or spent cooking oil.

Various techniques may be used to accurately apply the matrix on the support sheet. The preferred technique is a printing technique. Other techniques include screening, coating, spraying and casting.

THE DRAWINGS

FIG. 1 is cross-sectional view in elevation of a filter in accordance with this invention;

FIG. 2 is a fragmental enlarged cross-sectional view of the filter shown in FIG. 1 and indicating paths of flow;

FIG. 3 is an enlarged elevational view partially broken away illustrating a particle incorporated in the filter of FIGS. 1–2; and FIG. 4 is a view similar to FIG. 3 showing binder covering parts of the particle.

DETAILED DESCRIPTION

The present invention is directed to providing a matrix which may be incorporated in a filter structure for the removal of ingredients such as contaminants from a fluid and/or the dispersion or application of ingredients into a fluid. Reference is made to copending U.S. Pat. No. 5,885,633, all of the details of which are incorporated herein by reference thereto. That application discloses various materials which may be incorporated in the filter as part of the matrix for treating the fluid. In that application the fluid is preferably a liquid. The invention, however, may also be used where the fluid is a gas.

FIGS. 1–2 illustrate a filter 10 in accordance with this invention. As shown therein, a matrix 12 is applied to a support sheet 16 with a cover sheet 14 over the matrix. It is to be understood that within the broad practice of this invention the filter may be a laminate of two layer structure, namely, a matrix and a carrier sheet which could be either the support sheet or the cover sheet. The invention may also be practiced with more than one matrix layer, with or without a support sheet between adjacent matrix layers.

In the preferred practice of this invention sheets 14 and 16 are made of fluid pervious material and preferably material generally used for filtering purposes. In particular, the cover sheet 14 is preferably made of filter material so as to subject the fluid to an initial filtering action before entering the matrix. Any known filter materials may be used for sheets 14 and 16 such as non-woven polymers and paper. Other porous materials include metallics, ceramics and various plastics and composite materials.

By using filter material for layer 14 multiple functions are achieved such as an initial filtering of the fluid, providing protection from undissolved particulate matter for the matrix and to some extent causing the fluid to beneficially spread laterally as it enters the matrix.

A key feature of the present invention is the matrix layer 12. Layer 12 basically includes at least two parts. In one practice of the invention one of the parts is the adsorbent phase wherein particles made of a fluid treating material having an active surface area are provided in order to comprise the working component of the matrix. The particles 18 are held in place by a binder 20. In the illustrated embodiment, particles 18 comprise a base material 22 such as silica in microparticulate microporous form covered with a functional coating 24 of a material such as a long straight chain carbon (carbon 18). Particles 18 thus function as an adsorbent to, for example, remove, capture and retain organic contaminants or components of interest from the fluid. The particles 18 are held in place by binder 20 so that matrix 12 is thus in the form of a bed.

Binder 20 is of a material which is impervious to the flow of the fluid. As a result, the fluid can not readily flow through matrix 12 but must flow only in areas where there is no binder. In accordance with this invention an insufficient amount of binder 20 is incorporated in matrix 12 so as not to completely cover the active surface 24 of particles 18. As a result, large portions of the inner and outer surfaces of the particles are free of contact by the binder. In the preferred practice of this invention the bed or matrix 12 incorporates less than 50% by weight of binder so as to assure the creation of a dense bed, but in any case less than 100% to assure that sufficient portions of the particles will not be contacted by the binder. The optimum range of binder material is 10 to 30% by weight.

The specific proportion of binder to particles would depend, for example, upon the types of particles being used, such as the size and shape and porosity of the particles. What is important is that there be sufficient binder to cause the particles to be held in place in the bed or matrix and to create areas which are impervious to the flow of fluid; yet the amount of binder should be significantly less than would result in completely covering the particles so that portions of the active surface of the particles would be free of binder and thus create the path of flow for the fluid.

Any suitable binder material may be used, preferably, a polymeric material is used such as polyvinyl acetate cross-linked with a suitable cross-linker. The action of cross-linking may or may not require heat. By providing the binder 20 in an amount which leaves portions of the active surface of the particles free from contact with the binder, tortuous paths are created over which the fluid is forced to flow in order to pass through the bed. FIG. 2, for example, schematically illustrates the paths by the arrows 26. It is to be understood that the proportions and representations of the various materials in filter 10 of FIG. 2 are merely for illustrative purposes.

The binder preferably has moderate viscosity so that it will function to keep the particles from migrating and to retain proper positioning to fill any voids. Thus, for example, the particles will be properly distributed to assure attaining the tortuous pervious paths rather than having larger particles migrate together. The binder could have any suitable viscosity to achieve its intended function. A moderate viscosity is found to be best. After being cross-linked, the binder must have resistance to swelling or dissolution in organic or other solvents.

As an example, filter 10 may include as its intermediate layer or matrix, binder and adsorbent material in a ratio of binding polymer to adsorbent materials of 0.1 gm:0.6 gm. The support or base sheet 16 may be made of melt blown polypropylene fibers, highly calendered of 0.0075 inches thickness. The cover sheet or top layer 14 may be melt blown polypropylene fibers 0.0163 inches thick. The overall thickness of filter 10 is about 1 mm.

The binder 20 enables the particles 18 to adhere to each other and/or the binder, thus creating a dense bed and creating non-pervious areas which forces the fluid into flow paths where the fluid is forced to contact the active surface of the particles. The particle size is preferably in a range of 2–200 micron and more preferably about 10 microns or less. The particles may be spherical and irregularly shaped with larger spheres creating some open areas. The particles are preferably uniformly mixed and may have different size and geometry.

While surface modified silica is a particularly effective adsorbent, other adsorbents could be used such as styrene di vinylbenzene or charcoal or other metal oxides with or without surface modifications on any of these particles.

The invention is preferably practiced where the particles and their coating material are pervious to the flow of fluid such as by using so-called bonded porous microparticulate particles. This facilitates a continuous tortuous path through the matrix permitting the fluid to flow through the particles themselves. This further assures the contact of the fluid with the particles and their active surfaces, and therefore highly effective extraction.

In one aspect the invention may be considered as providing the material which is composed of two or more pervious particles which are dissimilar such as in size, composition, shape or porosity. The particles are in a matrix with impervious binder particles such that tortuous paths are formed around the active surface of the particles for adsorption and/or dispersion purposes with respect to a fluid flowing through the matrix. The matrix may be a bed composed of such dissimilar particles and may include a plurality of different particles having different purposes such as for removing different contaminants and/or for adding different ingredients to the fluid.

In accordance with the invention it is possible to provide a method of sizing and blending various dissimilar pervious particles in a homogeneous manner where the dissimilar pervious particles are evenly dispersed throughout the matrix. The matrix may be in the form of a slurry having ink-like characteristics so as to be printed or screened in appropriate patterns to control the flow of fluids and to permit the use of commercially available equipment for applying the ink-like slurry, so that, upon curing, a matrix results which is capable of performing the removal and application functions. This also permits the ability to control the "solids" per surface area in the application of the crude ink. Upon curing, the matrix would remain flexible. The invention lends itself to performing in various conditions of temperature, pressure and chemical presence.

Various techniques may be used for applying the matrix to its support sheet. Such techniques include, for example, printing, spraying, screening, casting, coating and deposition, such as by ink-jet or pipette. The matrix may also be applied in a dry form, but this technique is not preferred. Preferably, the matrix is applied while in the form of a slurry which is flexible and self-supporting when cured or as applied to the substrate 16. The non-dry slurry form thus facilitates controlled dispensing or application to the substrate. The matrix may thus include mixed sorbents or particles which are dissimilar such as in geometry and/or phase/chemistry. The binder results in the matrix being self-supporting to form a webbing that does not completely block the flow of fluid through the matrix bed. The result is a structure superior to a packed bed without binder because the pervious sorbent particles are held stationary within the binder matrix which prevents channeling and break-through. The multiple size/type/shape of the pervious particles packs better and adsorbs better than single species beds. The matrix can be applied to the substrate or can be formed into a defined geometry. The matrix could be provided for ultimate use in roll or sheet form for large scale use, or could be cut into distinct individual shapes such as is known for filters. With the invention the particles 18 are secured in place forming a densely packed bed held by a webbing of adhesive or binder 20 which retains the particle position throughout the matrix for the prescribed fluid passage through the matrix. The particles are thus densely packed. The multiple pervious particle type composition permits filling in spaces to create multiple tortuous fluid flow paths. This provides efficient adsorption/desorption and/or dispersion of ingredients to the fluid passing through the-matrix.

The invention lends itself to widespread use from the industrial or commercial purposes to laboratory or household purposes. For example, where the filter 10 is used for capturing contaminants or other components the result is to purify or decontaminate the fluid and/or permit the analysis of the component or contaminant. While using different filters there could be a sequential elution of individual contaminants such as by using different solvents such as methanol and methylene chloride. In this instance the filters could be used in a laboratory for scientific sampling purposes.

Another use of the invention could be for decaffeinating coffee by using particles which have a specific affinity or adsorption characteristic for the caffeine in the coffee.

Similarly, the filters could be used in restaurants, for example, to filter cooking oil. The cover sheet 14 would initially filter food particles such as potatoes or charred oil. The filter could be used to regenerate the cooking oil by removing the degradation products and then replenishing the oil with materials such as anti-oxidants from the particles 18.

A further use of the filter could be for treating motor oil similar to a vehicle oil filter and providing beneficial additives and therefore could be used in commercial garages for regenerating spent motor oils.

As noted, the particles may contain fluid enhancing materials which would be dispersed into the fluid. Reference is again made to U.S. Pat. No. 5,885,633 which discloses various flavor enhancing materials. The invention may also be practiced where different types of particles are used in the same matrix or different layers so that a combination results wherein different materials are added to the fluid and/or different types of adsorbents are utilized for different removal functions.

What is claimed is:

1. A filter for treating fluids comprising a matrix containing one or a plurality of types of particles, said particles having an inherently active surface having the characteristic of fluid treating capability to treat a fluid which comes into contact with said active surface, said particles being pervious to the flow of fluid, a moderately viscous binder, said binder being impervious to the flow of the fluid, said binder contacting said particles to secure said particles in place and create a densely packed bed, portions of said active surfaces of said particles being free of contact with said binder, and tortuous paths of flow being created through said bed at said portions of said active surface to cause a fluid to intimately contact said fluid treating material as the fluid flows through said bed.

2. The filter of claim 1 including a fluid pervious support sheet, and said bed being mounted on said support sheet.

3. The filter of claim 2 wherein said particles comprise at least two types of dissimilar pervious particles.

4. The filter of claim 3 wherein said particles are evenly dispersed throughout said moderately viscous binder.

5. The filter of claim 2 wherein said binder is a moderately viscous polymerizable material.

6. The filter of claim 5 wherein said particles are made of an adsorbent material having a functional coating.

7. The filter of claim 6 wherein said particles are made of a combination of polystyrene divinylbenzene and functionally coated silica, said functional coating being a long straight chain hydro-carbon, and said polymeric binder being made of a cross-linked polyvinyl acetate.

8. The filter of claim 2 wherein said binder comprises less than 100% by weight of said bed.

9. The filter of claim 8 wherein said binder comprises between 10% and 30% by weight of said bed.

10. The filter of claim 2 including a cover sheet over said bed, and said cover sheet being made of a fluid pervious filter material.

11. The filter of claim 10 wherein said bed is initially in the form of a slurry.

12. The filter of claim 11 wherein said slurry is in the form of crude ink which is printed on said support sheet.

13. The filter of claim 2 wherein said particles include applicating material which is added to the fluid when contacted by the fluid.

14. The filter of claim 2 wherein said particles are made from a material capable of capturing inorganic components of a fluid.

15. The filter of claim 2 wherein said particles comprise different types of particles having different fluid treating characteristics from each other.

16. The filter of claim 15 wherein said different types of particles include adsorbent particles and include applicating particles.

17. The filter of claim 2 wherein said particles are of a size in the range of 2–200 microns and include spherical and irregularly shaped particles.

18. The filter of claim 2 including a plurality of said beds to form a multilayer multifunctional structure.

19. The filter of claim 1 wherein said particles are uncoated.

20. The filter of claim 2 wherein said particles are made from a material capable of capturing organic components of a fluid.

21. The filter of claim 2 wherein said particles are made from a material capable of retaining organic components of a fluid.

22. The filter of claim 2 wherein said particles are made from a material capable of retaining inorganic components of a fluid.

* * * * *